Sept. 9, 1958     J. Z. DE LOREAN     2,851,586
PIVOTAL HEADLIGHT ASSEMBLY FOR MOTOR VEHICLES
Filed Feb. 15, 1956
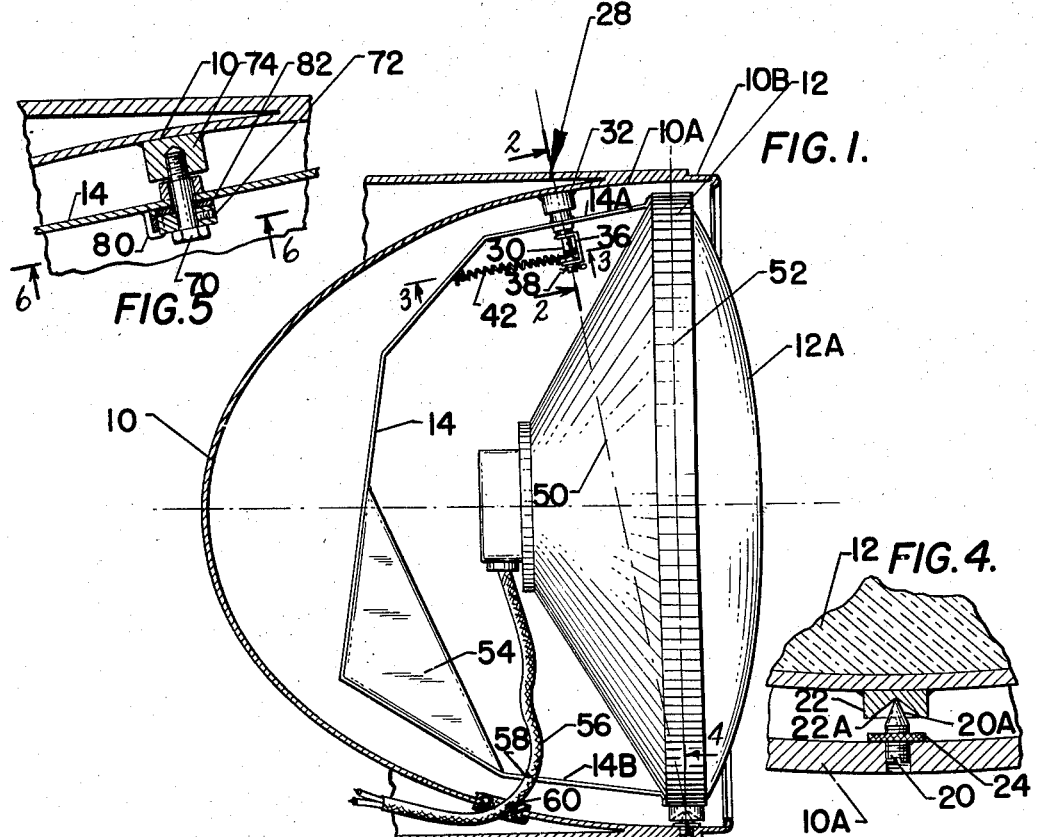
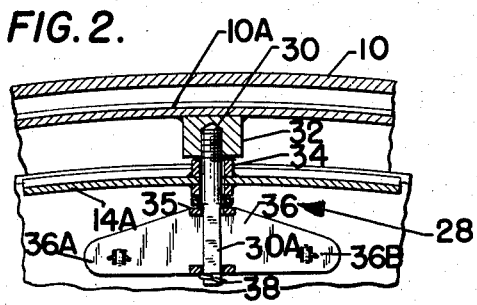
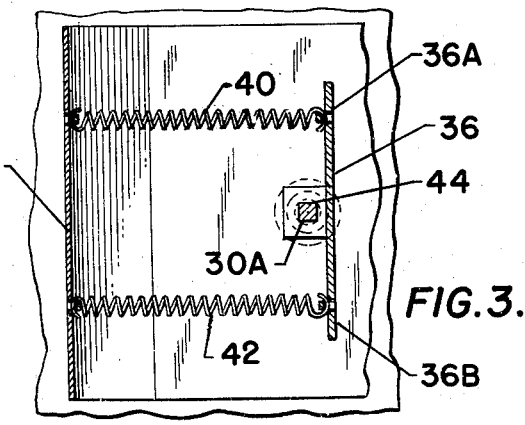
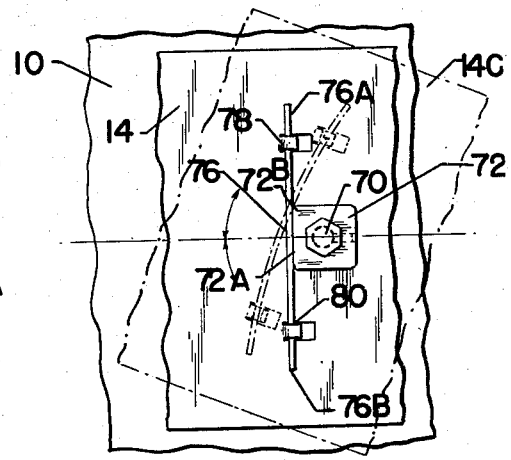
INVENTOR.
JOHN Z. DELOREAN
BY
ATTORNEYS

United States Patent Office 2,851,586
Patented Sept. 9, 1958

2,851,586

PIVOTAL HEADLIGHT ASSEMBLY FOR MOTOR VEHICLES

John Z. De Lorean, Birmingham, Mich.

Application February 15, 1956, Serial No. 565,692

3 Claims. (Cl. 240—8.25)

This invention relates to a pivotal headlight assembly for motor vehicles and the like which is adapted to pivot the headlight substantially in line with the direction in which the vehicle is moving.

It has long been recognized that one of the hazards of night driving is the fact that while the vehicle is negotiating a turn in the road, the headlights are pointed at an angle to the direction of the road on which the vehicle is traveling, and thus the driver is frequently unable to see objects that are directly ahead of him. Numerous attempts have been made to overcome this problem, all of which have proven commercially unsuccessful for cars produced on a production basis, due to their relatively high cost, and the difficulties of installation. For example, in the prior devices of this nature there generally was included a mechanical linkage between the steering mechanism and the headlight assembly, which necessarily required a relatively complicated arrangement of gears and controls.

To overcome these difficulties this invention contemplates an extremely simple and novel device in which the centrifugal force developed when a vehicle is being turned, is utilized to effect a corresponding pivotal movement of the headlight, so that the light beam is directed along the road ahead of the vehicle. In addition, the invention includes a novel pivotal means for supporting the headlight assembly, whereby the latter is quickly recentered in its initial position when the vehicle is again moving in a straight line.

For a better understanding of the present invention, reference may be had to the accompanying drawings, in which:

Figure 1 is a side elevation view of a headlight assembly including the invention;

Figure 2 is a view in section taken along lines 2—2 of Figure 1 showing details of the upper pivotal means of the headlight assembly;

Figure 3 is a view in section taken along lines 3—3 of Figure 1;

Figure 4 is a view in section taken along lines 4—4 of Figure 1 showing the lower pivotal means of the headlight assembly;

Figure 5 is a partial horizontal view showing a modified form of the upper pivotal means; and Figure 6 is a view in section taken along lines 6—6 of Figure 5.

Figure 1 discloses a cup shaped retainer 10 for a sealed beam unit 12 which is adapted to be mounted in its customary position in the forwardly facing portion of a conventional motor vehicle fender or front grill. If desired, retainer 10 may be formed as an integral portion of the vehicle fender.

The retainer 10 has a forwardly extending side portion 10a which is generally of circular shape, the outer edge 10b of which surrounds a sealed beam illuminating unit 12. A substantially U-shaped mounting bracket 14 extends within retainer 10, behind the sealed beam unit 12, with its opposite ends 14a and 14b connecting with upper and lower portions of the sealed beam unit. The mounting bracket 14 is disposed in a vertical plane, which intersects the plane of the forwardly facing illuminating surface 12a of the sealed beam unit 12 substantially at right angles.

The lower edge of the sealed beam unit is supported by a pivot pin 20, which is most clearly shown in Figure 4. The pivot pin 20 is threaded through the side portion 10a of retainer 10, and its pointed end 20a is supported within a recessed bearing surface 22a of a bearing element 22, fixedly mounted on the lower edge of the sealed beam unit 12. A lock nut 24 is threaded about the pivot pin 20 between the retainer and sealed beam unit 12, and serves to hold the pivot pin 20 in any desired position.

The upper leg portion 14a of the supporting bracket 14 is pivotally supported by the pivot device indicated generally at 28, details of which are shown in Figures 1 and 2. The pivot device 28 includes a pivot pin 30 supported by a bracket 32 which is connected to the retainer 10 by suitable means, such as welding. The pivot pin 30 extends through a bushing member 34 carried by the upper leg portion 14a of the supporting bracket 14. The bracket 14 is supported in position on pin 30 by a washer 35, a retainer element 36, and a cotter pin 38 extending through an opening near the lower edge of pin 30. As is best seen in Figures 2 and 3, the lower portion 30a of the pivot pin 30 which carries retainer element 36, is square shaped, thereby holding the latter against relative rotation with respect to pin 30.

The retaining element 36 has two side portions 36a and 36b extending outwardly and generally at right angles to pin 30, as shown in Figures 2 and 3, which connect with springs 40 and 42 respectively. The springs 40 and 42 in turn connect with the supporting bracket 14 and serve to position bracket 14 and the sealed beam unit 12 in a central forwardly facing position with respect to the outer edge 10b of the retainer 10. Thus, when the vehicle is standing still, or moving in a straight direction, the sealed beam unit faces in the line of direction of the vehicle.

As is best shown in Figure 1, the axis of the pivot pins 20 and 30 indicated generally at 50 is disposed at an angle extending rearwardly of a vertical plane of the sealed beam unit indicated at 52; the upper pivot means 28 being disposed the greatest distance behind the vertical axis 52 of the sealed beam unit, and the lower pivot 20 being disposed substantially in the line therewith.

A weight 54 is carried by the supporting bracket 14 near the lower side 14b thereof. A wire 56 for conducting electricity to the sealed beam unit 12 extends through an opening 58 in the lower side portion 14b of the supporting bracket 14. The wire 56 also extends through a resilient bushing means, as for example a rubber grommet 60 mounted in an opening in the retainer 10. Sufficient slack in the wire 56 is provided to permit freely pivotal movement of the supporting bracket and sealed beam unit.

In operation it will be seen that as the vehicle is moved in a straight ahead direction, the headlight assembly is maintained in a forwardly facing position by weight 54, due to the tilted axis of the pivot pins 20 and 28 with respect to the bracket 14. Also, springs 40 and 42 assist in maintaining the headlight assembly facing straight ahead, and further act to dampen any oscillating motion of the headlight caused by any vibration, or by vertical movement of the vehicle. If desired, additional dampening means may be provided; for example, by inserting a rubber bushing in the recessed bearing surface 22, adjacent the lower pivot pin 20.

As the vehicle is turned to follow a curve in the road, the sealed beam unit is pivoted in the direction of the turn by the centrifugal force acting on weight 54. It will be appreciated that the greater the turning movement of the vehicle, the greater the centrifugal force acting on the weight 54 and, therefore, a correspondingly increased pivotal movement is imparted to the sealed beam unit.

It will be understood that other types of pivotal means may be utilized for supporting this sealed beam unit and its supporting bracket within the retainer, and other types of spring means may be utilized to center the headlight in a straight ahead direction.

A further modification of the upper pivot 28 of Figure 1 is shown in Figures 5 and 6. In Figures 5 and 6 it will be seen that a threaded pivot pin 70 extends through a square shaped washer element 72 mounted on the supporting bracket 14, and pin 70 is threaded into member 74 fixedly mounted on the retainer 10 (see Figure 5). A wire spring element 76 is disposed along a side 72a of the square shaped washer element 72, and its opposite ends 76a and 76b are connected by brackets 78 and 80 respectively, which in turn are fixedly mounted on the upper leg portion 14a of the supporting bracket 14. By suitable means, such as by welding the washer element 72 to the pin 70, the washer element 72 is maintained in a fixed position with respect to the pivotal movement of the supporting bracket 14, and to eliminate friction, a bearing washer 82, carried by pin 70, may be inserted therebetween. The wire spring element 76, thus serves to maintain the mounting bracket 14 and sealed beam unit 12 in a central position when the vehicle is standing still or moving in a straight line, in a manner similar to spring 40 and 42 of the modification shown in Figures 2 and 3.

When the supporting bracket 14 and the sealed beam unit 12 are pivoted relative to the pivot pin 70, to the dotted line position indicated at 14c in Figure 6, the wire spring element 76 is flexed as it is moved into contact with corner 72b of the washer element 72. Thus, when centrifugal force is no longer acting on weight 54 carried by mounting bracket 14, as for example when the vehicle has negotiated a turn and is once again driving in a straight direction, the wire spring element 76 returns the mounting bracket 14 and sealed beam unit 12 to its initial centered position.

It is to be appreciated that the above invention is subject to various modifications apparent to those skilled in the art, and that it may be utilized for other purposes; i. e., it may be used in conjunction with tractors, trains and aircraft. Accordingly, it is to be understood that the above specification is for the purpose of illustration only and should not be construed as limiting the scope of the following claims.

What is claimed is:

1. A pivotal light assembly comprising illuminating means, a housing having an opening adapted to receive at least a portion of said illuminating means, a vertically disposed bracket carried by the top and bottom portions of the illuminating means and extending rearwardly thereof within the housing, pivot means carried by the housing for supporting the bracket and illuminating means within the housing for pivotal movement about an axis disposed at an angle of less than ninety degrees (90°) with respect to the horizontal plane, and weight means carried by the bracket rearwardly of the illuminating means within the housing to normally maintain said illuminating means facing the line of movement of the housing.

2. A pivotal light assembly for motor vehicles and the like comprising illuminating means, a housing mounted on the motor vehicle, said housing having an opening facing the normal line of direction of said vehicle and adapted to receive at least a portion of said illuminating means, a vertically disposed bracket connected with the top and bottom portions of the illuminating means, first pivot means carried by the housing and engaging with an upper portion of said bracket, a second pivot means carried by the housing and engaging with the lower portion of the illuminating means whereby the illuminating means and bracket are pivotally mounted about an axis passing through both of said pivot means, a retainer means rigidly carried by said first pivot means, a pair of outwardly extending arms on said retainer means, spring means connected between both outer ends of said arms and said bracket for retaining said bracket and illuminating means in a substantially stable path, and a weight carried by said bracket rearwardly of said illuminating means which is adapted to hold said illuminating means pointed in the direction of motion of the vehicle.

3. A pivotal headlight assembly for motor vehicles and the like comprising a sealed beam illuminating unit, a cup-shaped housing mounted on said vehicle having an opening facing the normal forward line of direction of said vehicle, and adapted to receive at least a portion of said sealed beam unit, a vertically disposed bracket fixedly connected with said sealed beam unit and extending behind the latter within the housing, upper and lower pivotal means mounted within said housing and supporting the bracket and sealed beam unit for pivotal movement about an axis passing through said pivotal means, the upper pivotal means being disposed rearwardly of the lower pivotal means so that the axis thereof is tilted rearwardly at an angle less than ninety degrees (90°) with respect to the horizontal plane, weighted means carried by the bracket and disposed behind the sealed beam unit within the housing to normally maintain said sealed beam unit facing the direction of the forward line of movement of the vehicle and dampening means connected with the bracket and a retaining element rigidly carried by said upper pivotal means for dampening the horizontal movement of said sealed beam unit.

References Cited in the file of this patent

UNITED STATES PATENTS

| 1,635,393 | Amans | July 12, 1927 |
| 2,606,999 | Tostevin | Aug. 12, 1952 |

FOREIGN PATENTS

| 111,053 | Switzerland | Aug. 17, 1925 |
| 473,540 | Great Britain | Oct. 11, 1937 |
| 962,335 | France | Dec. 5, 1949 |